United States Patent [19]
Hagmann

[11] 3,781,043
[45] Dec. 25, 1973

[54] MULTIPLE PIPE JOINT SEAL

[76] Inventor: Foster M. Hagmann, 130 N. Bristol Ave., Los Angeles, Calif. 90049

[22] Filed: Jan. 17, 1972

[21] Appl. No.: 218,363

[52] U.S. Cl............. 285/363, 277/11, 285/DIG. 11
[51] Int. Cl............................................. F16l 17/00
[58] Field of Search............. 285/363, 405, DIG. 11; 277/9, 11

[56] References Cited
UNITED STATES PATENTS
1,942,704  1/1934  Hubbard et al...................... 277/11
3,480,301  11/1969  Kroening ....................... 285/363 X Primary Examiner—Dave W. Arola
Attorney—Thomas M. Small

[57] ABSTRACT

A flanged, bolted pipe joint with a seal clamped between the flanges of the joint and located on the bolts of the joint. The seal has an annular body with sealing rings thereon, and with four locating fingers projecting outwardly along perpendicular diameters of the joint for locating engagement with bolts of different standard sizes on different standard bolt circles of a series of joints. One alternative form has two oppositely facing fingers for straddling in-line bolts of a standard series, and additional forms illustrate the specific application of the invention to four different ASA standard sizes of pipe joint.

11 Claims, 8 Drawing Figures

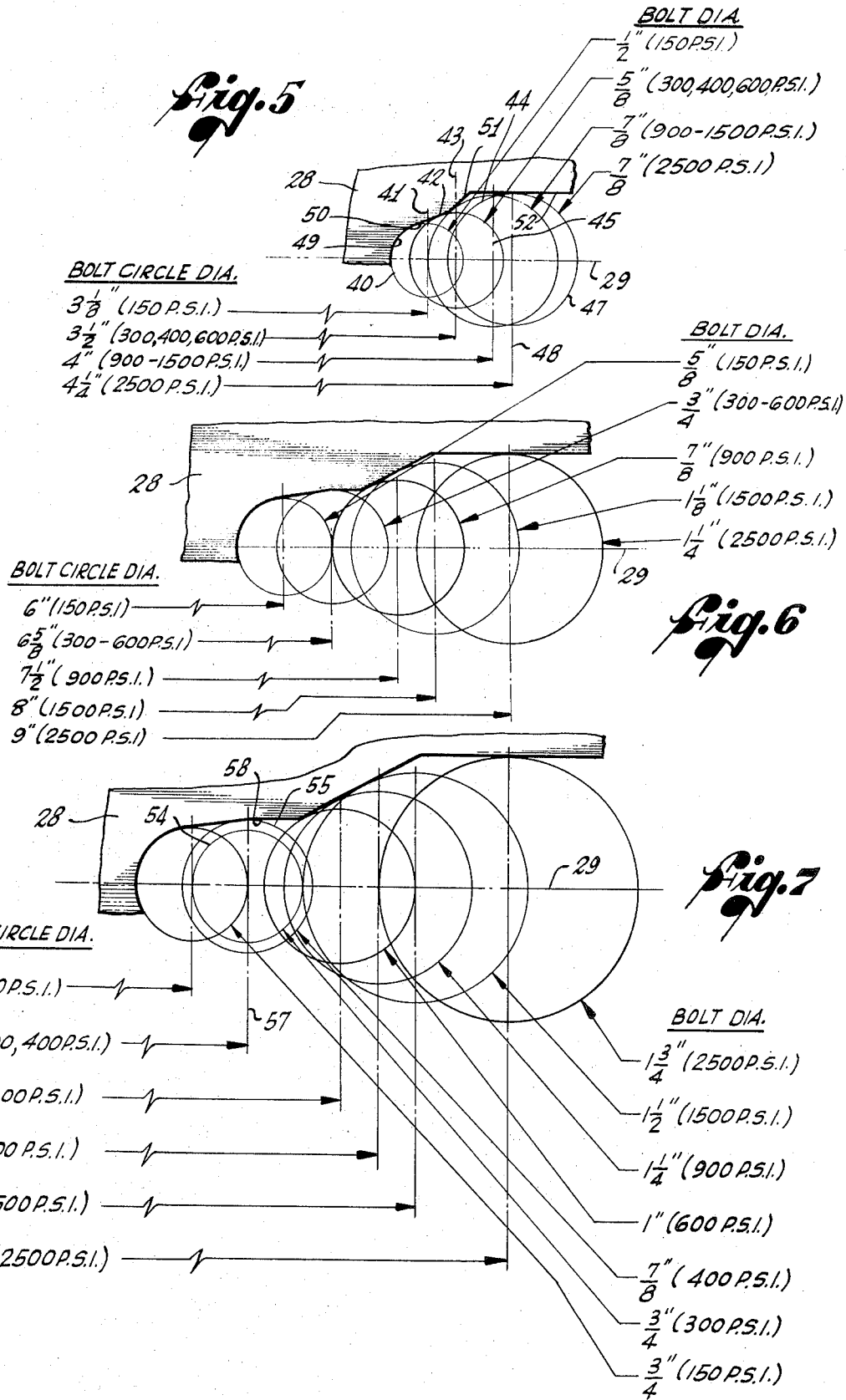

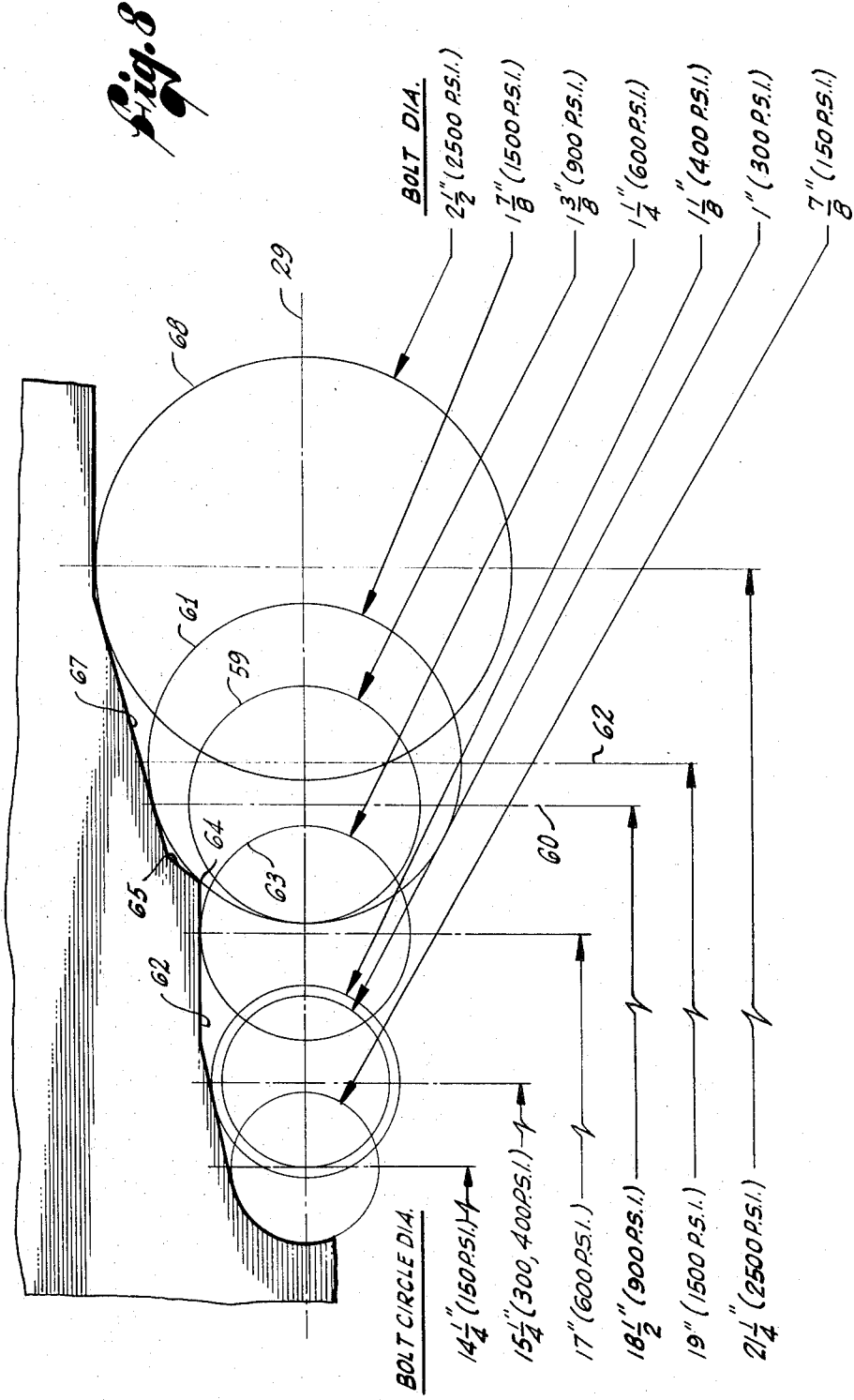

MULTIPLE PIPE JOINT SEAL

BACKGROUND OF THE INVENTION

This invention relates generally to seals or gaskets for use in pipe joints of the type in which annular flanges encircling the ends of two pipe sections are clamped together by bolts passed through the flanges, and has particular reference to the manner in which a seal is located and retained in the pipe joint preparatory to being clamped therein.

A seal for such a joint typically has an annular body formed with a central opening of approximately the same diameter as the passage defined by the interiors of the pipe sections that are connected by the joint, and has means encircling the central opening for sealing the interface between the ends of the sections when the flanges are clamped together against the opposite sides of the seal by the bolts through the flanges, parallel to the axis of the pipe and arranged in a circle coaxial with the pipe, referred to in the trade as the "bolt circle".

A customary practice has been to size the outside diameter of the body of the seal to fit closely inside the bolts of the joint and thus to be located by abutting engagement with the bolts. This type of seal, sometimes called a "ring gasket", has been used in joints in which the adjacent faces of the flanges have raised central portions, or bosses, smaller than the bolt circle and constituting the surfaces of the flanges against which sealing is accomplished.

Another practice, used in so-called "full-face" seals which do not have such bosses, has been to form holes through the seals to register with the bolt holes in the pipe flanges, and to insert the bolts through both the flanges and the seals so as to locate and retain the seals in the joints. While this approach very securely holds the seal in properly aligned relation with the pipe sections, it will be readily apparent that the assembly procedure is relatively complex and time-consuming.

Moreover, pipes vary widely in both size and the pressure for which the pipes and joints are rated, and the bolt-circle diameters of the joints of a given size of pipe are increased as the pressure ratings increase. In addition, as pressure ratings increase, it is standard practice to use larger bolts, at least in some of the larger bolt circles, and to increase the number of bolts in some of the larger bolt circles, typically in multiples of four.

As a result, different sizes of seals have been provided for different pipe sizes, and also for many of the different pressure-rated joints for pipes of a given size, to accommodate the different bolt sizes and bolt circles of the various pipe joints. A given seal can be properly used in joints of different pressure ratings only if the bolt circles and bolt sizes for those pressure ratings are the same, which usually is not the case. Thus, for 24 different standard pipe sizes with internal diameters ranging from one-half inch to 24 inches, and with as many as seven different standard pressure ratings for a given size, most or all of which may have different bolt circles, it has been necessary to have more than 100 different seals in stock in order to service all of the different sizes and pressure ratings.

SUMMARY OF THE INVENTION

The present invention resides in a seal of the foregoing character which has unique locating fingers angularly spaced around the annular body of the seal and projecting generally radially outwardly therefrom along a plurality of preselected radial lines, with specially contoured edges facing toward the radial lines and spaced therefrom for locating engagement with a plurality of bolts of different sizes lying on a plurality of different bolt circles but along the preselected radial lines. Thus, one seal will serve a plurality of different joints in a pipe of a given size, so as to reduce, very substantially, the number of seals needed for all of the pressure ratings and sizes.

It is standard practice to have a minimum of four bolts in each pipe joint, and always to have four bolts positioned on two perpendicular diameters of the joint. Thus, the different pressure-rated joints for a pipe of a given size have bolts arranged on four radial lines that are common to all of the joints, and properly contoured locating edges can be positioned for engagement with bolts of different pressure-rated joints of that size along the common radial lines. Accordingly, it is possible to provide locating fingers on a seal that will serve the locating and retaining functions for all pressure-rated joints of one size, so that a single seal can be used in any of the pressure-rated joints of that size, thus reducing the number of seals to be stocked to the number of sizes of pipe to be serviced.

In a few instances in a standard system, two different sizes of bolts may be positioned on identical or closely adjacent bolt circles so as to prevent precise locating engagement of the contoured edge with both sizes of bolts when the seal is located in its optimum position in each joint. In such instances, the locating edge can be contoured to engage the larger bolts in the optimum position and to lie close enough to the smaller bolts to accomplish practically acceptable location of the seal when it is used with the smaller bolts, the central opening in the seal being somewhat oversize to avoid interference with flow through the pipes if the seal is displaced from its optimum position to the extent permitted by clearances between the smaller bolts and the locating fingers.

In a preferred form of the seal, fingers are provided on the seal body on at least three sides thereof, and preferably on four sides, and at least one of the locating edges faces angularly in an opposite direction from the others to prevent rotation of the seal when it is in place. If desired, the fingers also may be arranged in two or more oppositely facing pairs for straddling two or more bolts and engaging the opposite sides of each such bolt. The single-finger approach, however, has the advantage of permitting the seal to be fitted more easily into place in a joint, and also permits the seal to be fabricated from smaller sheets of raw material, with resultant savings in the cost of material.

Further, the fingers of the preferred embodiments have arcuate section of the locating edges, adjacent the central annulus, which correspond in curvature and location to the curvature and location of the periphery of the bolts on the smallest bolt circle to be served by the seal, have intermediate sections of the locating edges offset away from the radial line farther than the sections engageable with the bolts on the smallest bolt circle, to engage larger bolts on larger bolt circles, and have outer sections of the edges that are offset still further to engage the largest bolts on the largest bolt circles to be served. It will be seen, however, that more than three situations may be accommodated and, in fact, are intended to be accommodated in the preferred forms of the invention.

The basic concept of the invention is applicable to any standardized system of pipe joints in which different bolt sizes and bolt circles are prescribed for different pipe joints having substantially the same inside diameter. The present invention has been developed, however, with an existing system in mind, namely, the ASA standard system set forth in ASA B16.5-1953. Moreover, the present invention has been adapted to the slip-on flanges of this system, which are regarded as presenting the most difficult situation, but the seals of the invention also are usable in other pipe joints, such as joints with welding-neck flanges.

Other objects and aspects of the invention will become apparent from the following detailed description, taken in conjunction with the accompanying drawings.

BRIEF DESCRIPTION OF THE DRAWINGS

FIG. 5 is a fragmentary view of part of a locating finger, together with diagrammatic illustrations of the bolt circles and bolt sizes in a series of pipe joints with which a seal with such locating fingers is designed for use, the particular finger shown being for use with an ASA standard pipe joint in the various pressure ratings of the joint; and FIGS. 6, 7 and 8 are views similar to FIG. 5 but diagrammatically showing locating fingers, bolt sizes and bolt circles for three different ASA standard pipe joints.

DETAILED DESCRIPTION

Figure 1:
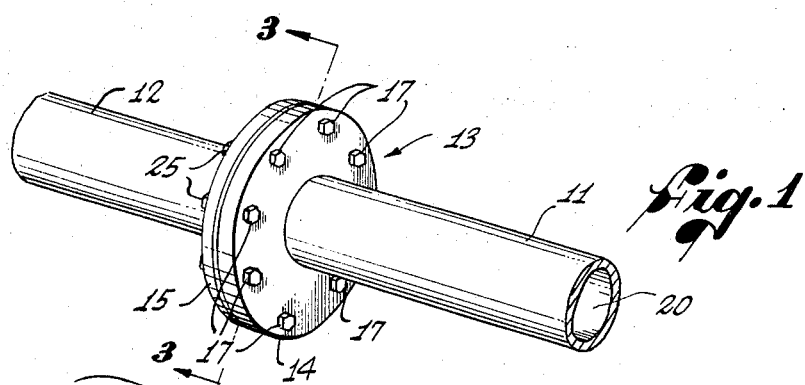
FIG. 1 is a fragmentary perspective view of a pipe joint equipped with a seal embodying the novel features of the present invention, and connecting two sections of pipe which are partly broken away and shown in cross-section.

As shown in the drawings for purposes of illustration, the invention is embodied in a gasket or seal 10 (FIGS. 2 and 3) for sealing the interface between two pipes 11 and 12 in a bolted pipe joint 13 comprising two annular flanges 14 and 15 on the adjacent ends of the two pipes and clamped together against the opposite sides of the seal by a plurality of bolts 17. Except for the configuration of the seal 10, and specifically the means for locating and retaining the seal in the pipe joint 13, the foregoing elements may be conventional in design and construction.

Figure 2:
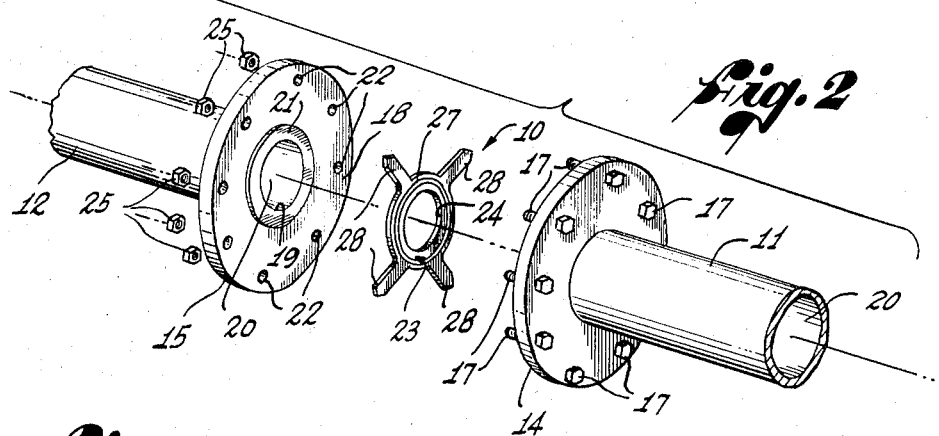
FIG. 2 is an exploded perspective view of the pipe joint of FIG. 1.
Figure 3:
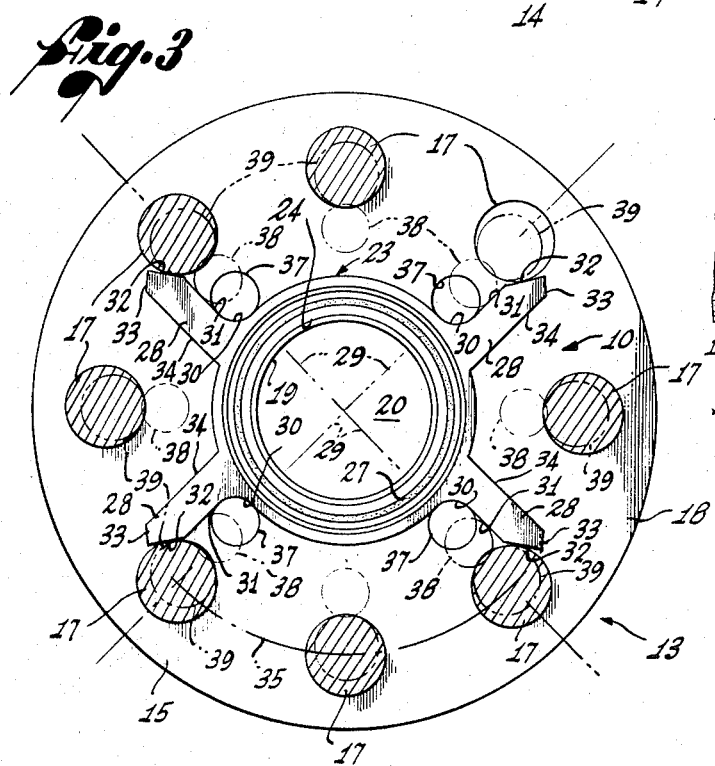
FIG. 3 is an enlarged cross-sectional view taken along line 3—3 of FIG. 1, and including broken-line representations of the positions of three additional sets of bolts of other pipe joints of a standard series.

More specifically, as shown most clearly in FIGS. 1-3, each flange 14, 15 is joined to the end of the associated pipe 11, 12 in coaxial relation therewith and has an annular face 18 surrounding a center hole 19 which is the end of the passage 20 through the associated pipe. Although the annular faces may be flat, to receive a so-called full-face seal or gasket, more often they are formed with raised bosses as shown at 21, which encircle the holes 19 and constitute the sealing surfaces of the flanges.

A plurality of bolt holes 22 are formed in each flange, on centers spaced a preselected distance from the axis of the pipe, and also spaced angularly around the flange at selected intervals along a reference bolt circle of preselected diameter larger than the outside diameter of the boss 21. Each flange in the illustrative joint of FIGS. 1-3 has eight bolt holes, which register with the bolt holes of the mating flange on the other pipe when the flanges are together, as shown in FIG. 1.

The seal 10 has an annular or ring-like body 23 defining a center hole 24 sized to encircle the center holes 19 in the flanges, and carrying or comprising means for sealing against the bosses 21 around these center holes, when the flanges are clamped together. In assembling the joint 13, the seal 10 is placed between the flanges in coaxial relation therewith and nuts 25 are threaded onto the threaded ends of the bolts 17 which have been inserted through the aligned holes 22 in the two flanges. These nuts then are tightened on the bolts to draw the flanges into tightly clamped relation, thereby joining the flanged ends of the pipes together in sealed relation for the transmission of fluid through the pipes.

Various types of sealing means may be incorporated in the annular body 23 of the seal 10, the illustrative seal having a body of sheet material, such as metal, that is formed on each side with a circular groove in which a ring 27 of deformable seal material is mounted. The volume of the deformable material is substantially equal to the void space in the groove, and the rings of deformable material are forcefully urged against the bosses 21 of the flanges when the latter are clamped together. A seal of this general type is shown in U.S. Pat. No. 3,542,382. It is to be understood, however, that the invention may be used with other sealing means (for example, with a seal composed of asbestos), and thus is not intended to be limited in any way to the particular sealing means shown herein for purposes of illustration.

As previously mentioned, it has been necessary to provide different seals for joints having bolt circles and bolt diameters of different sizes, because the seals are located in the joints by the bolts, either by fitting the seal inside the bolts in the case of ring seals, or by passing the bolts through the seals in the case of full-face seals. When the number of seals for a given pipe size is multiplied by the number of pipe sizes, it can be seen that the resulting number of different sizes of seals required to be stocked has been quite large.

The present invention provides a single seal 10 that will fit a plurality of different pressure-rated joints for a given pipe size, and that will be engaged and located in the joints by the bolts of various sizes and on the various bolt circles prescribed for the plurality of different pressure-rated joints. Accordingly, a single seal can be designed for all of the pressure-rated joints for one size of pipe, thereby significantly reducing the number of seals required for a full line of pipe sizes and ratings.

To the foregoing ends, a plurality of locating fingers 28 are angularly spaced around the body 23 of the seal and project generally radially outwardly from the body along preselected radial lines on which the several joints of the series have bolts on different bolt circles, and each finger has a specially contoured edge which faces toward the associated radial line and is spaced different distances therefrom adjacent the different bolt circles for locating engagement with the different sizes of bolts that are used on the bolt circles. At least one of the edges faces angularly in an opposite direction from the others, so as to hold the seal against turning when the fingers are engaged with the bolts, and there preferably are at least four such fingers, two facing angularly in each direction, for optimum locating of the seals.

In a preferred embodiment illustrated in FIGS. 2 and 3, it will be seen that the radial lines 29 along which the four fingers 28 project are spaced ninety degrees apart on two diameters of the joint that are perpendicular to each other. Conventional and standard joints have at least four bolts which are positioned on two such diameters, and most joints have more than four bolts, which are arranged on the same bolt circle but on different radial lines, with one or more bolts between each pair of bolts on adjacent radial lines 29. The bolts lying on the radial lines are used in this invention as the seal-locating bolts.

As shown in FIG. 3, each finger 28 is generally parallel to the adjacent radial line 29, and the contoured edge is on the side of the finger facing toward the radial line for engagement with the bolt 17 that is located on the radial line. In this instance, the contoured edge has a concave arcuate section 30 that curves outwardly from the periphery of the body 23, a straight intermediate section 31 which is parallel to the radial line 29, and a straight outer section 32 that is inclined outwardly and away from the radial line to the tip of the finger.

From the tip, a short tip section 33 is inclined back inwardly to a straight edge 34 which forms the opposite or back side of the finger and extends inwardly to the outer edge of the body, preferably parallel to the radial line 29. It should be noted that the shapes of the tip section 33 and the edge 34 are not critical, since no locating function is served by these elements.

The bolts 17 of the illustrative pipe joint 13 are arranged on a relatively large bolt circle, indicated at 35 in FIG. 3, and engage the inclined edge sections 32 adjacent the tips of the fingers, the inclined sections being tangent to the peripheries of the bolts. In this embodiment, the bolts 17 are the largest bolts in the series of joints to be served by the seal 10 and are on the largest bolt circle 35 of the series. Although the inclined edge sections 32 are shown as extending well beyond the points of engagement with the bolts, it will be apparent that the locating function is complete at the points of engagement.

The positions of other bolts of the illustrative series are indicated in broken lines in FIG. 3, wherein it will be seen that there is a set of four bolts 37 arranged on a smallest bolt circle, a first intermediate set of eight bolts 38 on a first intermediate bolt circle, and a second intermediate set of eight bolts 39 on a second intermediate bolt circle larger than the first intermediate bolt circle but smaller than the largest bolt circle 35. The bolts on the smallest and first intermediate bolt circles are of the same size, while the bolts on the second intermediate bolt circle are somewhat larger and the bolts on the outer bolt circle are still larger.

In the seal 10 for this series of joints, which is hypothetical but generally representative of the prescribed conditions for many joints, the arcuate edge sections 30 adjacent the inner ends of the fingers 28 lie along portions of the circumferences of the four bolts 37 on the smallest bolt circle, for locating engagement with those bolts if the seal is used in the joint that has these bolts. The straight intermediate sections 31 will engage the sides of the four bolts 38 that lie on the common radial lines 29 and on the first intermediate bolt circle, thus locating the seal if it is used in the joint that has these bolts.

To locate the seal 10 in either of the joints having the bolts 17 or 39 on the two larger bolt circles, each inclined edge section 32 is tangent to the peripheries of both of these bolts on the associated radial line 29. Thus, the inclined sections of the edges will engage the bolts found in the joint in which the seal is installed, whether it is the bolts 17 or the bolts 39.

Although only four bolt circles are illustrated in FIG. 3, it is to be understood that more than four pressure-rated joints may be represented, because some joints of different pressure ratings have the same sizes of bolts and bolt circles. Thus, the seal of FIG. 3 is to be regarded simply as a seal designed to accomodate four different bolt-and-bolt-circle combinations.

To block rotation of the seal 10 within the various joints, two of the fingers 28 have locating edges facing angularly in one direction, and the edges of the other two face in the other direction. As shown in FIG. 3, the edges of the two fingers on the lower side face oppositely, as do the edges of the two on the upper side.

A very convenient method of installing this seal 10 in any joint of the series is to insert the two lower seal-locating bolts through the aligned holes in the two flanges and, while the flanges are spaced apart a distance greater than the thickness of the seal, to drop the seal into the joint until the two lower fingers rest on the bolts in the manner shown in FIG. 3. Then the remaining bolts can be inserted quickly and easily into proper relation with the seal, which is held in the proper position by the engagement of the lower locating bolts and fingers, and the nuts can be tightened on all of the bolts.

Figure 4:
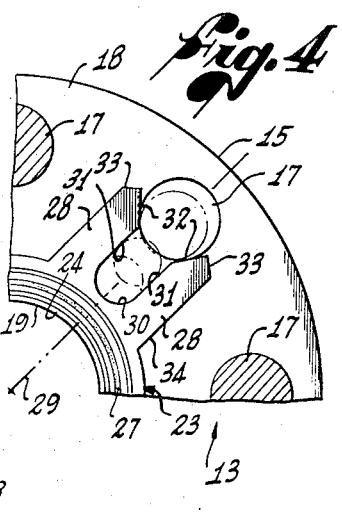
FIG. 4 is a fragmentary view similar to part of FIG. 3 but illustrating an alternative form of the invention.

An alternative embodiment illustrated fragmentarily in FIG. 4, in which the reference numbers of FIGS. 1–3 are used on corresponding parts, has locating fingers 28 that are virtually identical to those in FIG. 3, but arranged in oppositely facing pairs for straddling each seal-locating bolt on a radial line 29 and engaging generally opposite sides of the bolt. Two or more, and preferably four, pairs of such fingers are provided on a seal. While these fingers securely locate the seal, the size of the blank of sheet material required for this seal is larger than the blank required for the seal of FIG. 3, so that material costs will be somewhat higher. Moreover, the installation of this seal can be more complicated.

The schematic views in FIGS. 5 through 8 illustrate four specific locating edges for four specific ASA nominal pipe sizes, together with diagrammatic representations of the various ASA bolt sizes and bolt circles for the different ASA pressure ratings for each pipe size. The first, in FIG. 5, is for 1-inch pipes; the second, in FIGS. 6, is for 3-inch pipes, the third, in FIG. 7 is for 5-inch pipes; and the last, in FIG. 8, is for 10-inch pipes. In each case, bolt circles and bolt diameters are illustrated for pressure ratings of 150, 300, 400, 600, 900, 1500 and 2,500 pounds per square inch (P.S.I.).

In the 1-inch series (FIG. 5), the 150 P.S.I. joint has ½ inch bolts 40 lying on a bolt circle 41 3 and ⅛ inches in diameter. The 300 P.S.I. joint has ⅝ inch bolts 42 on a bolt circle 43 that is 3 and ½ inches in diameter, and the 400 and 600 P.S.I. joints use the same ⅝ inch diameter bolts on the same bolt circle. For both 900 and 1,500 P.S.I. joints, the size of the bolts 44 is seven-eighths of an inch and the bolt circle 45 is 4 inches in diameter, and for the 2,500-pound joint, the bolts 47 also are seven-eighths of an inch in diameter, but are on a 4 and ¼ inch bolt circle 48.

The locating edge for this series has an arcuate section 49 for curving around the inner bolt 40, an inclined straight section 50 tangent to both the inner bolt 40 and the next bolt 42 and continuing outwardly to a point of engagement with the third bolt 44. From this point, the edge is inclined outwardly at a sharper angle along a section 51 tangent to the third bolt, the intersection at the point preferably having a small radius applied to it. Finally, the edge has a section 52 extending outwardly parallel to the radial reference line 29 and spaced therefrom to engage the sides of both the outer bolts 44 and 47, which are of the same size.

Formed in this manner, the locating edge is engageable with each of the bolts shown, so as to locate the seal on the bolts in each joint of the series. The contour of the edge is specifically designed to provide at least a point of tangent engagement with each bolt. Of course, the fingers of this seal may be arranged in oppositely facing pairs, as in FIG. 4, or in a plurality of single fingers, as in FIG. 3.

The dimensions for the bolts and bolt circles for the 3-inch, 5-inch, and 10-inch series in FIGS. 6, 7 and 8, respectively, should be self-explanatory, except for two aspects of these series wherein the ASA specifications deviate from the usual situation. First, in the 5-inch series in FIG. 7, it will be seen that the bolts 54 and 55 of the 300 and 400 P.S.I. ratings, respectively, lie on the same nine and one-quarter inch bolt circle 57, but the 400 P.S.I. bolt 55 is larger than the 300 P.S.I. bolt 54. Thus, it will be apparent that the inclined edge section 58 along these bolts cannot be tangent to both of the bolts in the same position of the locating finger.

Instead, the edge section 58 is tangent to the larger bolt 55, and thus is spaced from the smaller bolt 54 in the optimum, centered and coaxial, position of the seal in the joint. It has been found that the gap between the smaller bolt 54 and the edge section 58 (about one-sixteenth of an inch) does not prevent satisfactory location of the seal when the center hole 24 of the seal body 23 is made oversize by a permissible amount. In other words, the displacement of the seal permitted by the one-sixteenth inch clearances is insufficient to move the edge of the opening 24 in the seal body into an objectionable position, that is, a position in which the seal would interference with fluid flow through the joint.

Similarly, in FIG. 8, the 900 P.S.I. bolt 59 is on a bolt circle 60 that has a diameter of 18 and ½ inches, and the 1,500 P.S.I. bolt 61 is on a slightly larger bolt circle 62, but has a diameter so much larger that the bolt 59 is entirely within the position of the bolt 61. Again, the locating edge cannot be made tangent to both of these bolts (except at the radial line 29, which is not practical from a locating standpoint), so the edge is brought close enough to the smaller bolt to perform its locating function within permissible limits, again considering the clearance gap between the seal and the inside diameter of the pipe.

To minimize such displacement of the seal in a 10-inch, 900 P.S.I. joint, the edge has a section 62 parallel to the radial line 29 and tangent to the next smaller bolt 63, and continuing beyond this bolt to a point 64 of engagement with the 1,500 P.S.I. bolt 61, adjacent the periphery of the 900 P.S.I. bolt 59. Then the edge is inclined outwardly along a section 65 tangent to the 1,500 P.S.I. bolt 61 at the point 64, and then turns back to a shallower angle along a second tangent section 67, which also is tangent to the largest bolt 68.

With this arrangement, the clearance gap between the 900 P.S.I. bolt 59 and the locating edge is reduced (at the point 64) to a much smaller width than the clearance at the point of engagement between the inclined section 67 and the larger bolt 61, a clearance that can be held to less than one-eighth of an inch, and the resulting possible displacement of the seal is held within permissible limits. It will be seen in FIG. 8 that the clearance could be even further reduced by inclining the edge 62 (outwardly and) toward the radial line 29, but it is preferred to have the locating edge progress radially outwardly and away from the radial line in successive sections, rather than to be inclined back toward the radial line.

From the foregoing, it will be apparent that the present invention provides a new and improved seal which can be designed in accordance with the concept of the invention to accommodate a plurality of different bolt sizes on different bolt circles, and thus to fit all of the different pressure-rated ASA standard pipe joints of a given standard size. Thus, the number of different seals needed for a full range of pipe joints is drastically reduced. Moreover, the invention makes possible substantial materials savings, can be adapted to sealing means of various types, and facilitates the assembly of the pipe joints in many situations.

It also will be apparent that, while specific embodiments have been illustrated and described, various changes and modifications may be made without departing from the spirit and scope of the invention.

I claim:

1. A seal for use in each of a standard series of at least three different pressure-rated, flanged pipe joints for a pipe of a given standard size, wherein the joints for the different pressure ratings have at least three concentric bolt circles of predetermined diameters and bolts of predetermined diameters on the bolt circles appropriate to the corresponding pressure ratings, and wherein each joint has at least four bolts of a given bolt diameter lying on a given bolt circle and on four radial lines common to all of the joints and constituting the opposite portions of two perpendicular diameters of the joints, said seal comprising:

an annular body formed with a central opening larger than the inside diameter of the pipe and having a circular outer edge smaller than the smallest of the bolt circles;

means on said body for sealing each of the pipe joints around said opening when said body is clamped in the pipe joint;

and four retaining fingers secured to said body and projecting generally radially outwardly therefrom in angularly spaced relation to extend along the radial lines, each of said fingers having a contoured edge facing toward the associated radial line for locating engagement with bolts of the different bolt diameters on the different bolt circles an on the associated radial line;

and each such edge including:

an inner arcuate section curved about a predetermined arc for extending along a portion of the circumference of the bolt on the bolt circle of the smallest diameter and substantially concentric therewith, said arcuate section curving laterally and outwardly from the radial line for abutting engagement with one of the smallest bolts, at least one intermediate section spaced laterally a greater distance from the associated radial line than said arcuate section for abutting engagement with the side of a bolt of an intermediate diameter on an intermediate bolt circle, and an outer section spaced laterally a still greater distance from the associated line for abutting engagement with the side of a bolt of a largest diameter on a largest bolt circle;

two of said edges facing angularly in one direction, and the other two facing angularly in the opposite direction to block turning of said seal.

2. A seal as defined in claim 1 in which said arcuate section merges with a second intermediate section along which the edge is substantially parallel to said radial line and extends radially outwardly at least to a second intermediate bolt circle smaller than the first intermediate bolt circle, for use in a standard series of joints having two adjacent bolt circles with bolts of the same diameter on each.

3. A seal as defined in claim 1 in which said intermediate section of said edge is straight and inclined radially outwardly and away from the associated line, and said outer section is a correspondingly inclined, straight continuation of said intermediate section, both said intermediate section and said outer section being tangent to the abutting bolts.

4. A seal as defined in claim 1 in which the standard series has two pipe joints with bolts of two different diameters on the same bolt circle, and in which the sections of said edges for locating the seal relative to the two different bolts are tangent to the larger of the bolts and spaced a predetermined distance from the smaller of the bolts when the seal is located in the optimum position in the joint, said central opening being larger than the inside diameter by an amount correlated with said predetermined distance to prevent interference with fluid flow through the joint when the seal is displaced from said optimum position by the amount permitted by the spacing of the smaller bolts said predetermined distance from the associated sections of said edges.

5. A seal as defined in claim 1 in which the standard series has two pipe joints with bolts of two different diameters on closely adjacent bolt circles with the position of the smaller of the two different bolts entirely within the position of the larger thereof, and in which said edge has a first section substantially parallel to the associated radial line and tangent to a bolt spaced radially inwardly from the smaller bolt, and a second section extending outwardly and away from the radial line from a point of intersection of said first section at the periphery of the larger bolt, said point of intersection being spaced a preselected distance from the position of the smaller bolt when the seal is located in the optimum position in the joint, and said central opening being larger than the inside diameter by an amount correlated with said predetermined distance to prevent interference with fluid flow through the joint when the seal is displaced from said optimum position by the amount permitted by the spacing of the smaller bolts said predetermined distance from the associated sections of said edges.

6. A seal as defined in claim 1 in which said fingers are arranged in oppositely facing pairs for straddling the bolts and engaging opposite sides thereof.

7. A seal for use in each of a standard series of at least three different pressure-rated, flanged pipe joints for a pipe of a given standard size, wherein the joints for different pressure ratings have at least three concentric bolt circles of different predetermined diameters and bolts of at least three different predetermined diameters on the bolt circles, and wherein each joint has a plurality of bolts of a given bolt diameter lying on a given bolt circle along substantially equally angularly spaced, radial lines common to all of the joints, said seal comprising:

an annular body having a central opening sized to extend around the inside diameter of the pipe, and an outer edge spaced radially inwardly from the smallest of the bolt circles;

means on said body for forming a seal in each of the pipe joints around said opening when said body is clamped in the pipe joint;

and at least three locating fingers secured to said body and projecting generally radially outwardly therefrom in angularly spaced relation along the radial lines, each of said fingers having a contoured edge facing toward the associated radial line for locating engagement with bolts of the different diameters on the bolt circles and the associated radial line;

and each such edge including:

an inner section positioned to abut against a bolt of a first predetermined diameter on the smallest bolt circle and on the associated radial line to prevent movement of the edge toward the abutting bolt, at least one intermediate section spaced radially outwardly from said inner section and laterally from the associated radial line and from said inner section to abut against a bolt of a second, larger diameter on an intermediate bolt circle, to prevent movement of the edge toward the abutting bolt, and an outer section spaced radially outwardly from said intermediate section and laterally from the associated radial line and from said intermediate section to abut against a bolt of a third, largest diameter on a third, largest bolt circle to prevent movement of the edge toward the abutting bolt;

at least two of said edges facing angularly in opposite directions to block turning of said seal.

8. A seal for use in each joint of a series of bolted pipe joints having a plurality of concentric bolt circles of different predetermined diameters and having bolts of predetermined diameters on the bolt circles appropriate to the corresponding pressure ratings, each joint of the series having bolts arranged on a plurality of angularly spaced, radial lines common to all of the joints, said seal comprising:

a body having a central opening;

means on said body for sealing each of the joints around said opening when the body is clamped in the joint;

and at least three locating fingers secured to said body and projecting outwardly therefrom in angularly spaced relation, each of said fingers extending along one side of one of the radial lines and having a contoured edge facing toward the radial line and spaced a selected distance therefrom adjacent each bolt circle for locating engagement with bolts of different diameters lying on the different bolt circles, said contoured edges being spaced laterally from the associated radial lines at least two different distances adjacent different bolt circles for engagement with bolts of different diameters on such different bolt circles, and at least two of said edges facing angularly in different directions.

9. A seal as defined in claim 8 in which said body has a circular inner edge larger than the inside diameter of the pipe joints in the series, and a circular outer edge smaller than the smallest of the bolt circles, and in which four locating fingers project outwardly along four radial lines constituting the opposite end portions of two perpendicular diameters of the joints, each such finger having a contoured edge including an inner arcuate section curved about a predetermined arc corresponding to a portion of the circumference of the bolt on the bolt circle of the smallest diameter, at least one intermediate section offset laterally from the radial line a greater distance than said inner section, and an outer section offset laterally from the radial line a greater distance than the intermediate section, at least one of said edges facing angularly in an opposite direction from the others.

10. A seal as defined in claim 9 in which at least one of said sections is straight and inclined outwardly and away from the radial line.

11. A seal as defined in claim 9 in which said intermediate section is straight and inclined outwardly and away from the radial line, and said outer section is a correspondingly inclined, straight continuation of said intermediate section, both such sections being tangent to the bolts on the different associated bolt circles.

* * * * *